(12) United States Patent
Brenner et al.

(10) Patent No.: US 12,216,670 B2
(45) Date of Patent: Feb. 4, 2025

(54) MONITORING DATA USAGE TO OPTIMIZE STORAGE PLACEMENT AND ACCESS USING CONTENT-BASED DATASETS

(71) Applicant: Dell Products L.P., Round Rock, TX (US)

(72) Inventors: Adam Brenner, Mission Viejo, CA (US); Jehuda Shemer, Kfar Saba (IL); Steven Sadhwani, Round Rock, TX (US); Valerie Lotosh, Ramat-Gan (IL); Erez Sharvit, Ramat-Gan (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/975,368

(22) Filed: Oct. 27, 2022

(65) Prior Publication Data

US 2024/0143610 A1    May 2, 2024

(51) Int. Cl.
*G06F 16/2458* (2019.01)
*G06F 11/34* (2006.01)
*G06F 16/2455* (2019.01)
*G06F 16/28* (2019.01)

(52) U.S. Cl.
CPC ...... *G06F 16/2462* (2019.01); *G06F 11/3409* (2013.01); *G06F 16/24564* (2019.01); *G06F 16/285* (2019.01)

(58) Field of Classification Search
CPC ............... G06F 16/2462; G06F 16/285; G06F 16/24564; G06F 11/3409
USPC ......................................................... 707/713
See application file for complete search history.

(56) References Cited

U.S. PATENT DOCUMENTS

| | | | |
|---|---|---|---|
| 7,158,994 B1 | 1/2007 | Smith | |
| 9,626,710 B1* | 4/2017 | Chheda | G06F 9/5061 |
| 2011/0093471 A1 | 4/2011 | Brockway | |
| 2012/0109958 A1 | 5/2012 | Thakur | |
| 2014/0289202 A1* | 9/2014 | Chan | H04L 67/306 |
| | | | 707/652 |
| 2018/0027006 A1* | 1/2018 | Zimmermann | H04L 63/0227 |
| | | | 726/11 |
| 2018/0225177 A1 | 6/2018 | Bhagi | |
| 2019/0182294 A1 | 6/2019 | Rieke | |
| 2019/0272335 A1 | 7/2019 | Liu | |
| 2020/0133781 A1 | 4/2020 | Reddy Av | |
| 2021/0240659 A1 | 4/2021 | Wee | |
| 2021/0165782 A1 | 6/2021 | Deshpande | |

(Continued)

*Primary Examiner* — Hosain T Alam
*Assistant Examiner* — Nicholas E Allen
(74) *Attorney, Agent, or Firm* — Staniford Tomita LLP

(57) ABSTRACT

Embodiments of monitoring data assets in a system to apply rules to optimize storage and access of the data assets based on data content rather than data location, by defining rules based on the monitoring attributes, wherein a rule dictates a storage location of selected data or access permissions to the data by one or more persons or groups in the system. The selected data is tagged with a defined metadata tag, and a dataset is created by running a query against a data catalog to derive the dataset. A component monitors data usage and access of data elements referenced by the dataset to detect any violations of the defined rules, and provides a notification of any violation to facilitate remedial action by a user or process. The dataset can span multiple storage devices of different types to define a single processing unit for the monitoring attributes.

16 Claims, 14 Drawing Sheets

(56) References Cited

U.S. PATENT DOCUMENTS

2022/0012251 A1\* 1/2022 Colcord ............... G06F 9/3005
2022/0318421 A1 10/2022 Berube
2022/0335340 A1\* 10/2022 Moustafa ............ G06F 11/3003
2023/0079486 A1 2/2023 Yallagadda \* cited by examiner

900

```
┌─────────────────────────────────────────────┐
│ Define a Protection Policy to Protect Certain Data stored │
│ in different storage devices and/or network environments │
│                      902                    │
└─────────────────────────────────────────────┘
                      ↓
┌─────────────────────────────────────────────┐
│   Gather metadata of data objects to be protected   │
│                      904                    │
└─────────────────────────────────────────────┘
                      ↓
┌─────────────────────────────────────────────┐
│         Store gathered metadata in a Catalog        │
│                      906                    │
└─────────────────────────────────────────────┘
                      ↓
┌─────────────────────────────────────────────┐
│ Run a Query against the Catalog to generate a dataset │
│  comprising metadata selectors as tags for matching  │
│                cataloged metadata                    │
│                      908                    │
└─────────────────────────────────────────────┘
                      ↓
┌─────────────────────────────────────────────┐
│  Apply the Defined Protection Policy to the Dataset to │
│        protect corresponding content data            │
│                      910                    │
└─────────────────────────────────────────────┘
```

FIG. 9

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, and Data Domain Restorer are trademarks of DellEMC Corporation.

MONITORING DATA USAGE TO OPTIMIZE STORAGE PLACEMENT AND ACCESS USING CONTENT-BASED DATASETS

TECHNICAL FIELD

Embodiments are generally directed to large-scale data storage systems and more specifically to implementing dataset lifecycle management processes for large datasets.

BACKGROUND

Enterprise data is scaling to extreme sizes in present business ecosystems. Users have traditionally relied on a single person or a small team of people to understand and manage all the data for a company. In the context of data protection, this would be the backup administrator or system admin team. Backup administrators would work with data owners who produce and consume the data, and would create lifecycle policies on the data so that data would be backed up, restored, moved, or deleted according known rules. These rules or policies could be anything from when to tier, archive, backup and delete the data, in accordance with appropriate company and legal requirements.

As the sheer amount of data has grown, however, such users have had to change their operating models. Having a single person or team simply cannot scale to handle these increases. They thus must choose among a few options to keep up the increase in data, such as grow the team, invest in automation, and/or move the responsibilities of data management to the creators of the data, while overseeing compliance. While the operating model has changed, one element has not changed, and that is that lifecycle rules are very data specific. This means that the person creating the lifecycle rules has to know where the data exists, who created the data, and for how long the data needs to be saved.

Present methods of handling the management of data lifecycles in the context of very large and dynamic datasets are simply unable to keep up with ever increasing management demands, such as when the incoming rate of data exceeds the capacity to manage the data lifecycles. For example, it is forecasted that volumes of unstructured data in enterprise environments will grow to exabyte scales in the future. This explosive growth in data will not come from a single source or process, but will instead come from many areas within a user environment, such as core networks, edge devices, public/cloud networks, and so on. Moreover, data will be generated by automated processes and consumed by other processes and due to the size, volume and variety of data.

Another challenge with the increase in data volumes is the complexity of monitoring and easily accessing data placed in multiple locations and used by many different people and teams. In multi geographic organizations, employees typically like to place project data they work on close to them to minimize latency. For example, Heavily worked on projects (with high rate of read/write access) may be placed on faster storage, while old (and read-only) projects may be monitored for unexpected writes. In vast distributed systems, however, monitoring of same project data patterns can become overly cumbersome making it difficult to place content data in optimal locations for efficient use.

What is needed, therefore, is a data management system that monitors data ownership and use throughout an entire organization to efficiently place data in appropriate storage locations and/or assign appropriate attributes to the data for efficient use.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 9 is a flowchart illustrating a method of managing datasets lifecycles, under some embodiments.

DETAILED DESCRIPTION

Figure 1:
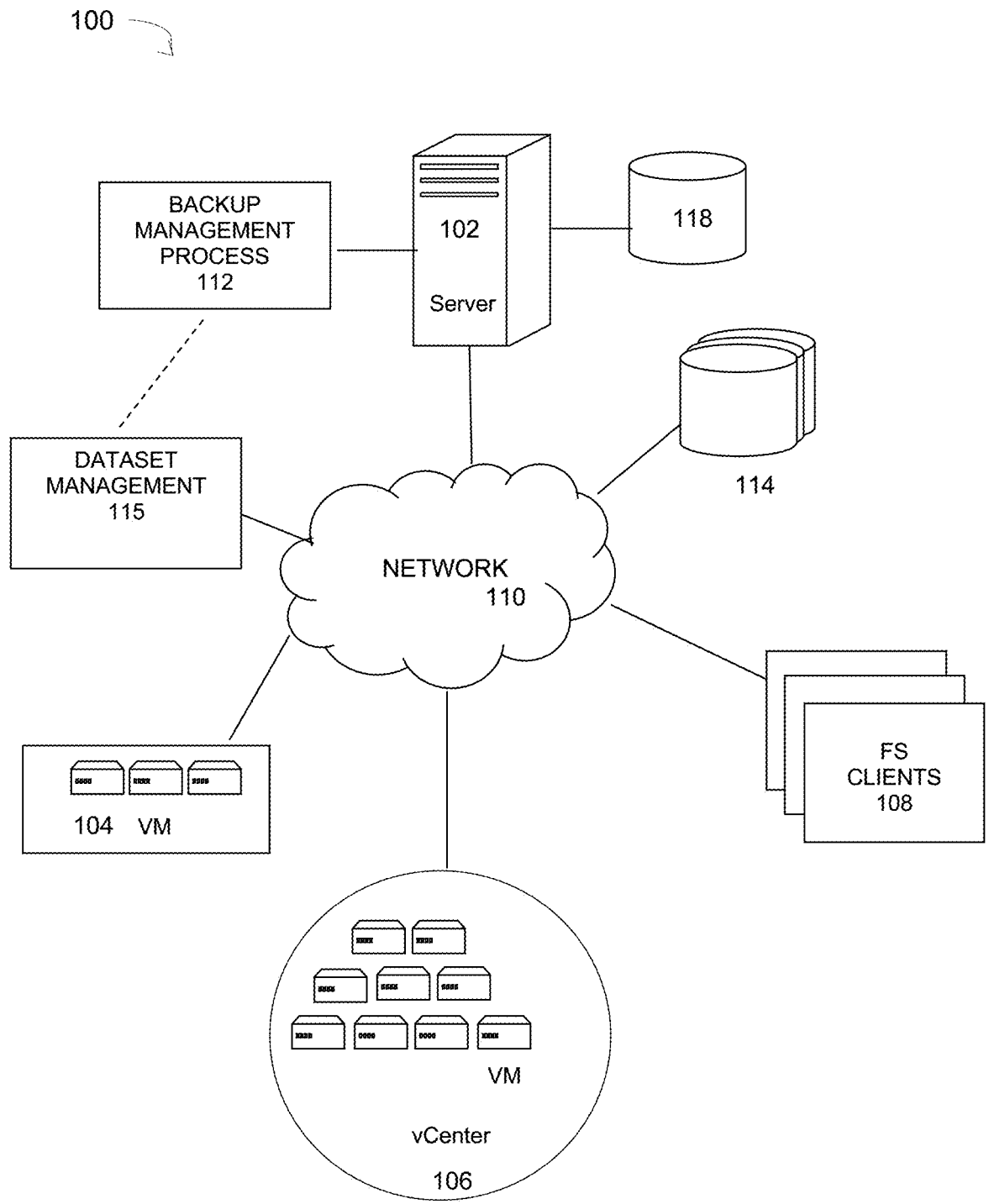
FIG. 1 is a diagram of a large-scale network implementing a large-scale dataset management process for content-based data protection, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated data storage techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more processes and components for managing the lifecycles of large-scale datasets, under some embodiments. The term 'lifecycle' refers to the different stages data as it goes from creation to ultimate deletion. In general, when data is first created, it is actually or at least assumed to be more active, more important, higher priority, etc. As data ages, however, files and documents usually become less important, or maybe at least less frequently accessed or current. For example, with respect to data protection systems, data that was created and backed up five years ago is generally treated as less important than data created the previous day.

As shown in FIG. 1, system 100 includes a network server computer 102 coupled directly or indirectly to the target VMs 106, and to data sources 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform.

The data sourced by system 100 may be stored in any number of other storage locations and devices, such as local client storage, server storage (e.g., 118), or network storage (e.g., 114), which may at least be partially implemented through storage device arrays, such as RAID components. The storage 114 may represent Network Attached Storage (NAS), which is generally dedicated file storage that enables multiple users and heterogeneous client devices to retrieve data from a centralized disk. Users on a local area network (LAN) can access the shared storage via a standard Ethernet connection. Other similar systems may also be used to implement an NAS resource.

Embodiments can be used in a physical storage environment, a virtual storage environment, or a mix of both, running a deduplicated backup program. In an embodiment, system 100 includes a number of virtual machines (VMs) or groups of VMs that are provided to serve as backup targets. Such target VMs may be organized into one or more vCenters (virtual centers) 106 representing a physical or virtual network of many virtual machines (VMs), such as on the order of thousands of VMs each. The VMs serve as target storage devices for data backed up from one or more data sources, such as file system (FS) clients 108, or other backup clients. Other data sources having data to be protected and backed up may include other VMs 104. The data sourced by the data source may be any appropriate type of data, such as database data that is part of a database management system.

In this case, the data may reside on one or more storage devices of the system, and may be stored in the database in a variety of formats.

In system 100, server 102 executes a data storage or backup management process 112 that coordinates or manages the backup of data from one or more data sources 120 to storage devices, such as network storage 114, client storage, and/or virtual storage devices 104. The data sourced by the data source may be any appropriate data, such as database data that is part of a database management system, and the data may reside on one or more hard drives for the database(s) in a variety of formats. In an embodiment, the backup process 112 uses certain known full and incremental (or differencing) backup techniques along with a snapshot backup process that is used to store an image or images of the system(s) to be backed up prior to the full or incremental backup operations.

In an embodiment, the network system 100 may be implemented as a DellEMC PowerProtect Data Manager (or similar) data protection system. This is an enterprise-level data protection software platform that automates data backups to tape, disk, and flash-based storage media across physical and virtual environments. A number of different operating systems (e.g., Windows, MacOS, Linux, etc.) are supported through cross-platform supports. Deduplication of backup data is provided by integration with systems such as DellEMC Data Domain and other similar storage solutions. Thus, the server 102 may be implemented as a DDR Deduplication Storage server provided by DellEMC Corporation. However, other similar backup and storage systems are also possible. In a general implementation, a number of different users (or subscribers) may use backup management process to back up their data on a regular basis to virtual or physical storage media for purposes of data protection. The saved datasets can then be used in data restore operations to restore any data that may be lost or compromised due to system failure or attack.

In an embodiment, system 100 may represent part of a Data Domain Restorer (DDR)-based deduplication storage system, and server 102 may be implemented as a DDR Deduplication Storage server provided by DellEMC Corporation. However, other similar data storage systems are also possible. A deduplication storage system generally represents a single-instance storage system in which redundant copies of data are eliminated to reduce storage overhead. Redundant data blocks are replaced with a pointer to the unique data copy so that only one unique instance of data is stored on the storage media (e.g., flash memory, disk, tape, etc.).

The data protection server 102 executes backup and recovery software that are crucial for enterprise-level network clients. Users rely on backup systems to efficiently back up and recover data in the event of user error, data loss, system outages, hardware failure, or other catastrophic events to allow business applications to remain in service or quickly come back up to service after a failure condition or an outage. Secure and reliable backup processes form the basis for many information technology (IT) services. Large-scale data storage networks rely on periodic or continuous data protection (CDP) methods using snapshot copies to automatically save copies of changes made to the data. This allows the network to capture earlier versions of the data that the user saves, thus providing the ability to restore data to any point in time in the event of hardware failure, system outages, and other significant disruptive events.

Embodiments of process 115 provide lifecycle management for datasets, and typically large-scale datasets. Essentially, datasets are a logical grouping of files, objects or both that exists anywhere in a user environment. A dataset is a logical collection of metadata for unstructured files and objects that are grouped together by one or more filters from a data query in a catalog. Examples of datasets include: all the x-ray images produced in the last 24 hours, sensor data from a particular facility, all the files in a subfolder on a NAS device, all office documents that exists on NAS and object storage, and so on. Datasets can thus be organized by data location, age, type, ownership, and so on, or any combination of such factors. A single dataset can span multiple storage devices, such as NAS and object storage. Additionally, datasets can span multiple operating environments like edge and core devices, and private, public, and cloud networks.

As used herein, the term metadata generally means a set of information that describes or provides information about other data. Metadata describes the actual content or file data, such as by specifying the file name, file type, file location, and so on. Metadata is generally many orders smaller than the content data (which can be huge depending on the application generating the file), and uniquely identifies the file comprising the content data, thus providing an efficient way to catalog, index, and otherwise process the file containing the content data.

As stated above, data protection systems (e.g., Avamar, Networker and PowerProtect Data Manager from DellEMC) require a user to create a protection policy that protects all or part of one or more data assets. By protecting assets, this allows data protection products to backup and restore the assets, which in turn offer protection and recovery of data on the assets. This model of protecting assets works well when users always know where their data is located. However, if the data is spread across many different assets, current data protection products struggle to adequately protect the data in these cases. Embodiments of process 115 provide the ability to group and protect data as one unit, regardless of where or how many assets they are located on. This is performed by the concept of datasets that are used in protection policies instead of assets. The result is that protection policies are composed of datasets which capture what the data is versus where it is. This simplifies the protection model by protecting data based on data types so that projects dispersed many multiple filesystems, storages, object stores, etc. may be dealt with as a single protection construct, i.e., the 'dataset.' Moreover, the dataset automatically tracks project data added, removed or relocated and so data protection will always be up to date on asset location changes even in the largest systems. In other words, datasets define content-based data protection as opposed to the location-based schemas of present systems.

In an embodiment, the data queries can be processed by a search engine process that is utilized to submit queries through a server (e.g., server 102) to the various data sources. Such a search engine examines a body of data in a systematic way for particular information specified in a textual search query input by a user. The body of data may be private corporate data or public data, such a web search. The search engine may employ one or more indexing schemes that associate words and other definable tokens to location or storage information (e.g., associating web pages to their domain names and HTML-based fields). A query from a user can be a single word, multiple words or a sentence, and the index helps find information relating to the query as quickly as possible. A user generally enters a query into the search engine as one or more keywords, and the index already has the names of the sites or locations containing the keywords, and these are instantly returned in response to the query from the index. If more than one response is returned for a query, they can be ranked in order of most to least relevant to the query based on number or closeness of keyword matches, and so on. The search engine may be a component within the server 102, or it may be provided as separate functional components in system 100, or as a cloud-based service, and so on.

Figure 2:
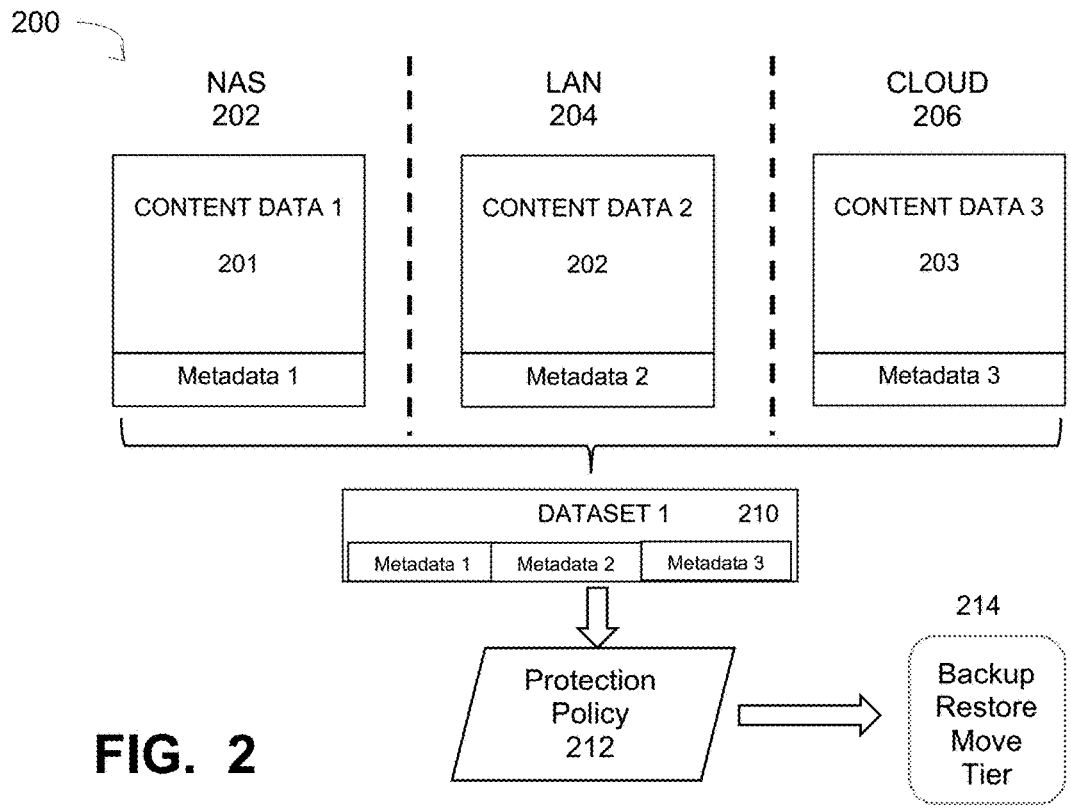
FIG. 2 illustrates creating datasets from metadata for unstructured files and objects, under some embodiments.

FIG. 2 illustrates creating datasets from metadata for unstructured files and objects, under some embodiments. As shown in FIG. 2, system 200 comprises three different example storage environments, such as NAS storage network 202, local (LAN) storage network 204, and cloud storage 206. Each of these storage locations can be used to store content data for a user or organization. For the example shown, content data 1 (201) may represent files and data objects stored by the user in NAS 202, content data 2 (202) may represent files and data objects stored by the user in local storage 204, and content data 3 (203) may represent files and data objects stored by the user in cloud 206. As can be seen in FIG. 2, each set of content data has associated metadata that provides information about the content data.

The content data in each or any of the storage locations typically comprises unstructured data, which is data that is not organized according to a preset data model or schema, and therefore cannot be stored in a traditional relational database or RDBMS. Examples of unstructured data include text, multimedia files, email messages, audio/visual files, web pages, business documents, and so on. The data may also comprise structured data that can be stored in one or more databases.

In an embodiment, the respective content data in each storage system is intended to be protected in the same manner, such as protecting the data as a single unit or through the same protection policy. In this case, the metadata for each storage type, e.g., Metadata 1, Metadata 2, and Metadata 3, are combined to form a single dataset, 210. A single or common protection policy 212 is then applied to the dataset 210 so that the content data referenced by the respective metadata is processed by the appropriate protection operation 214, such as backup, restore, move, tier, and so on.

Figure 3:
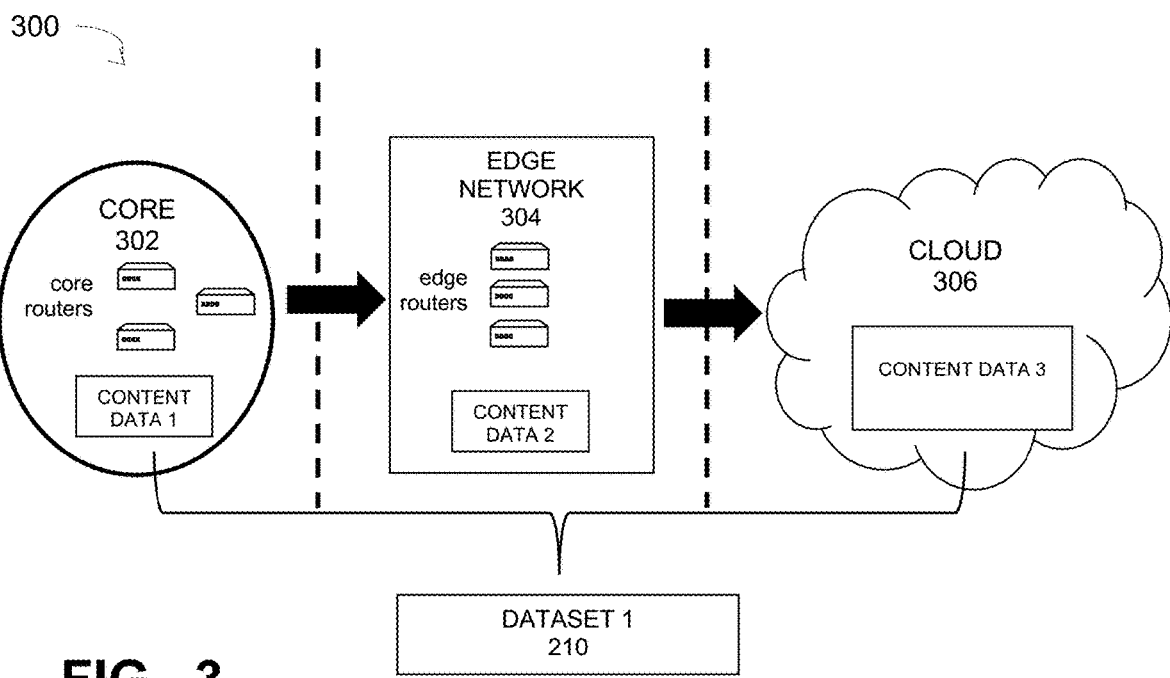
FIG. 3 illustrates data residing among different operating environments processed as a single dataset, under some embodiments.

FIG. 2 thus illustrates an embodiment in which a single dataset can span multiple storage devices and storage types. Such datasets can also span multiple operating or network environments. FIG. 3 illustrates data residing among different operating environments processed as a single dataset, under some embodiments. As shown in FIG. 3, system 300 comprises a core network 302 coupled to the public cloud 306 through an edge network 304. The core network 302 is the backbone or main network in an organization, and may be implemented as a datacenter (e.g., 106) or set of LAN/WAN networks through core routers. The edge network 304 contains edge routers that connect the core network 302 to cloud 306 or public networks (as shown), or to other core networks, or any other intra- or inter-network connection, as needed. For the example of FIG. 3, each network may store the content data illustrated in FIG. 2. Thus, content data 1 may be stored in core network storage, content data 2 may be stored in the edge network, and content data 3 may be stored in the cloud, for example. The metadata for these respective content data elements is grouped together and organized as dataset 1, 210 as shown in both FIGS. 2 and 3.

It should be noted that embodiments illustrated in FIGS. 2 and 3 are intended to be illustrative only, and any amount of data of any type may be stored in any of the storage types or network systems shown in FIGS. 2 and 3, or other similar storage and network systems.

As shown in FIGS. 2 and 3, a dataset 210 is formed from metadata to represent content data stored in different storage device and network environments to form a single data element that is protected by a protection policy. In this manner, data is protected based on what it is rather than where it is, as data spread across devices and networks can be treated as a unitary dataset for purposes of applying specific protection policies, thus providing content-based data protection for defined datasets.

In an embodiment, the data objects are independent between themselves and from the dataset. That is, the objects are edited or changed independently, and at some point an initial or revised version of the dataset is created at which point it captures the state of all the data objects it references.

Figure 4:
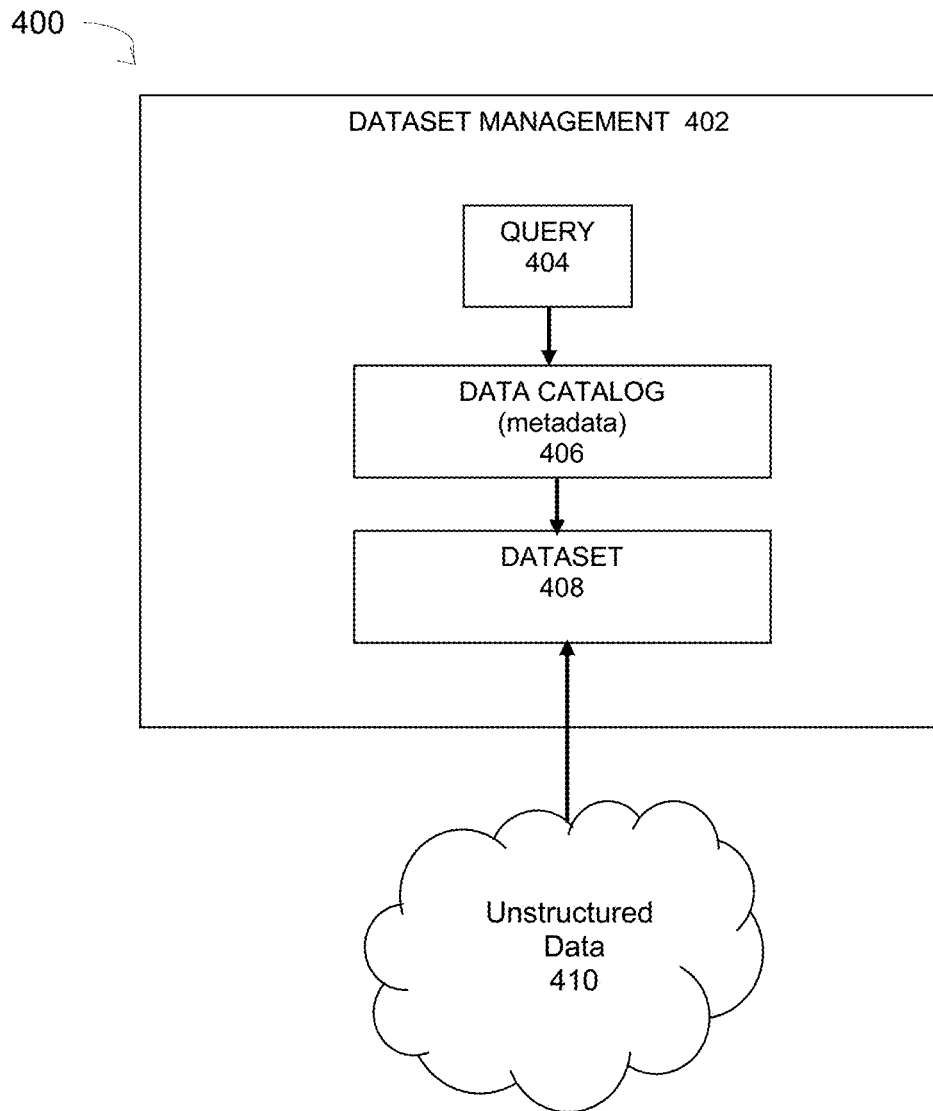
FIG. 4 is a diagram illustrating components of the dataset management processing component, under some embodiments.

FIG. 4 is a diagram 400 illustrating components of the dataset management processing component 115, under some embodiments. As shown in FIG. 4, the dataset management system 402 includes the three main components of a dataset 408, a data catalog 406, and a query 404. This system can access any unstructured data 410 stored in one or more unstructured data storage devices, such as Dell PowerScale, Elastic Cloud Storage (ECS), and similar storage devices. Metadata information from the unstructured data 410 can be captured from a data access product (e.g., Dell's DataIQ), which captures metadata information from unstructured storage devices 410.

DataIQ represents an example of a storage monitoring and dataset management software for unstructured data that provides a unified file system view of PowerScale, ECS, third-party platforms and the cloud, and delivers unique insights into data usage and storage system health. It also allows organizations to identify, classify, search and mobilize data between heterogeneous storage systems and the cloud on-demand, such as by providing features such as: high speed scan, indexing and search capabilities across heterogeneous systems, reporting on data usage, user access patterns, performance bottlenecks and more, and supporting data tagging and precision data mover capabilities. Although embodiments are described with respect to DataIQ management software, embodiments are not so limited, and any similar process for capturing metadata information from unstructured data and data storage may be used.

For purposes of the present description, the term 'DataIQ' refers to a product that represents a type of data catalog. It has and uses multiple databases (e.g., NoSQL databases and document stores) that hold metadata about files from NAS and object storage. It also includes components that scan the data for discovery and metadata extraction. Such a product can also include a component that connects to the DataIQ catalog (i.e., database) and presents a UI to the user. This includes being able to perform searches for files, show trends, storage usage, storage health, and so on. For purposes of the present description, the term DataIQ may be referred to as a 'scanning data catalog' or more simply as a 'data catalog.'

A dataset 408 is logical collection of metadata for unstructured files and objects that are grouped together by one or more filters from a data query 404 in a catalog 406. Datasets represent a subset of data that a user categorizes for specific needs. Actions performed on a dataset will affect only the underlying data it references. A single dataset can span multiple storage devices, such as NAS and object storage. Additionally, datasets can span multiple operating environments like edge devices, core devices, and cloud networks (as shown in FIG. 3).

In an embodiment, the data catalog 406 is a data element or technical framework that stores the dataset or datasets, and may embody a DataIQ data catalog or similar scanning data catalog. In general, a data catalog can be embodied as a simple database, or a database comprises of multiple tables or databases of different types, such as NoSQL databases, SQL databases, document stores, relational databases, and so on. The data consumed and used in a data catalog might be specific to one or more of those specific database types. Alternatively, the data catalog may also include a front-end interface (e.g., GUI) to different database applications or types for management, searches, and so on.

The data catalog 406 does not store the content data itself but rather metadata or pointers to the data. For example, there may be 1,000 movie files with each movie file being 10 GB in size. In this case, the data catalog will have 1,000 entries of just the metadata for those files. Such metadata comprises information that uniquely identifies the corresponding movie (or other content data), such as file name, file size, file location, file creation date/time, file update time, file permissions/ACL, and so on. Such metadata may also include additional information also stored in the data catalog specific to each file type. For example, the metadata for movies could also contain the resolution, the camera that was used, codec for audio or video, the stars in the movie, who directed it, and so on.

Datasets 408 are generated when data queries 404 are run on or executed against the metadata in a data catalog 406. Data queries 404 are the metadata-based queries that run against the data catalog, generating a dataset 408 as a result. The metadata selectors can vary from creation/modification timestamps, file size, file location (e.g., volume where the data resides), tags, or any other appropriate identifier. For this embodiment, tags are simple string values that are automatically generated and applied to files/folders in a filesystem or object storage based on user-defined rules. They are completely customizable, and these tagging rules can be specified by naming conventions of the file or file path, or something more advanced, such as results from AI/ML algorithms running against the file's contents (e.g., ImageRecognition for medical images).

In an embodiment, the tags represent a crucial piece of metadata, because they define 'what' the data is. Given that these tags describe what the data is, the user of the data catalog can declaratively use a data query to retrieve all the data they want, and only the data they want regardless of how and where it is stored, such as shown in FIG. 2.

In an embodiment, process 115 creates protection policies 212 composed of one or more data queries that represent the data to be protected by that policy. The results from these queries, once the policy is run, are the datasets themselves. The actions one can perform on these datasets would be the same data protection operations performed on assets using present systems. These include backups, restores, migrations, archive, deletions, etc. The difference is that under present embodiments, the actions 214 are on specific sets of data 210 rather than specific assets (VMs, Databases, NAS shares, etc.).

In general, a protection policy defines at least: a data asset to be protected, the storage target, and the storage duration. Other relevant information might also be specified, such as backup type (backup, move, tier, restore, etc.), access privileges, and so on. One example policy might be "backup Asset or Asset set A comprising VMs, databases, specific folders on NAS 1 every day and store for 1 month, and replicate the data off-site after 2 weeks." For a database, a protection policy may be exemplified as: "backup this TAG or set of TAGs every day and store for 1 month, and replicate the dataset off-site after 2 weeks." These are provided for purposes of illustration only, and other expressions and examples of protection policies are also possible.

Figure 5:
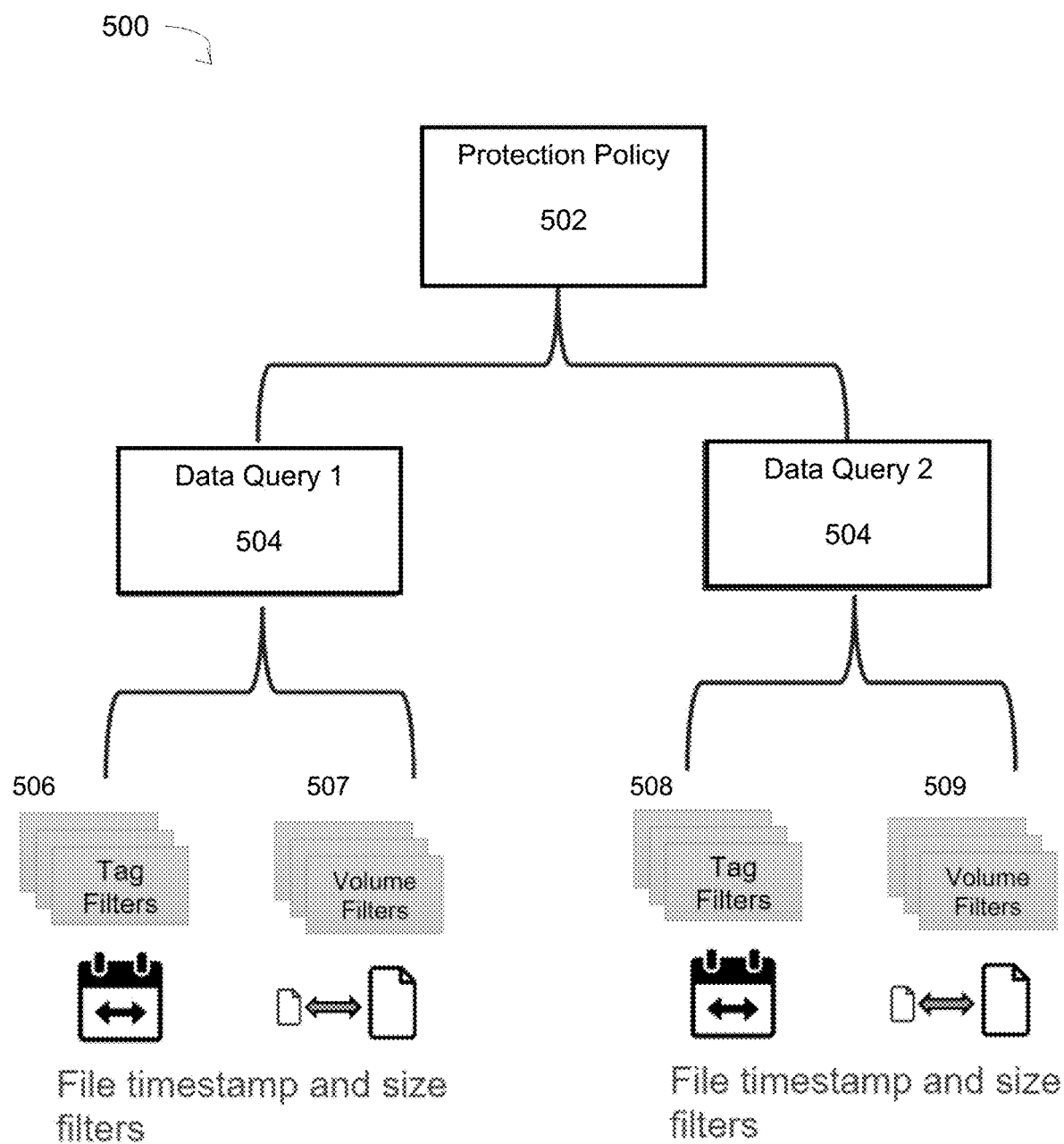
FIG. 5 illustrates protection policies composed of one or more data queries that find data in a data catalog based on file metadata, under some embodiments.

FIG. 5 illustrates protection policies composed of one or many data queries that find data in a data catalogs based off the files' metadata, under some embodiments. As shown in FIG. 5, system 500 includes a protection policy 502. The example of FIG. 5 includes two data queries as part of this protection policy, data query 1, 504, and data query 2, 506, which are each unique as to a particular backup. The data queries access certain tag filters 506, 508 and volume filters 507, 509, as shown, where the filters process file timestamp and size filters.

Figure 6:
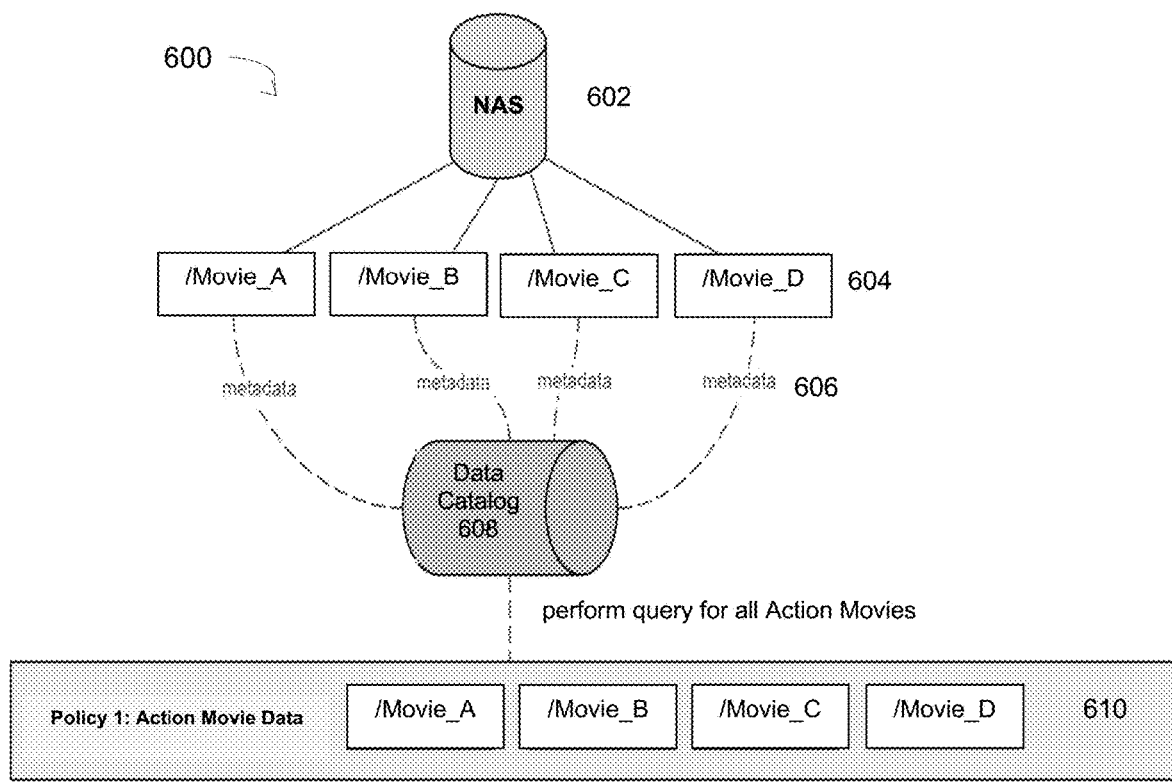
FIG. 6 illustrates an example of datasets and data catalogs used in data protection software, under some embodiments.

A shown in FIG. 4, the datasets are processed by a data catalog 406. FIG. 6 illustrates an example of datasets and data catalogs used in data protection software, under some embodiments. In this example, unstructured movie data is stored in a storage device, such as NAS 602. For this example, the user has defined a rule that tags specific assets (folders/files) with the tag "Action Movies" to denote that they are in the genre of action movies. For simplicity, the "Action Movie" tagging rule is applied if the word "Action Movie" is a prefix of a folder names, but any other tagging rule can also be used. If a user wanted to back up all of their Action movies 604 in their entire system (e.g., "Movie A", "Movie B", "Movie C", "Movie D", etc.) regardless of where or how they are stored, they can do this by querying the data catalog 608 to get all movies tagged with "Action Movie." They do not need to know which filesystems, storage platforms, or folders hold the data. In this case, the data catalog 608 will find the appropriate data it since it has the tag metadata 606. The result of the data query is the dataset 610. The user can then perform operations defined in 'Policy 1' on the data referenced by this dataset, which in this case may be a backup operation, or any other appropriate data protection operation.

Embodiments of the dataset management process 115 leverage any data catalog and produces a change file list from a catalog that does not have one and improves the current protection policy design by moving away from protecting assets to a model where it uses the tags, metadata and filesystem attributes to create a dataset that will be used by data protection software to create protection policies. This results in a content-based data protection as opposed to location or asset based data protection. This is in marked contrast to present backup software that force users to backup assets versus protecting data.

Figure 7:
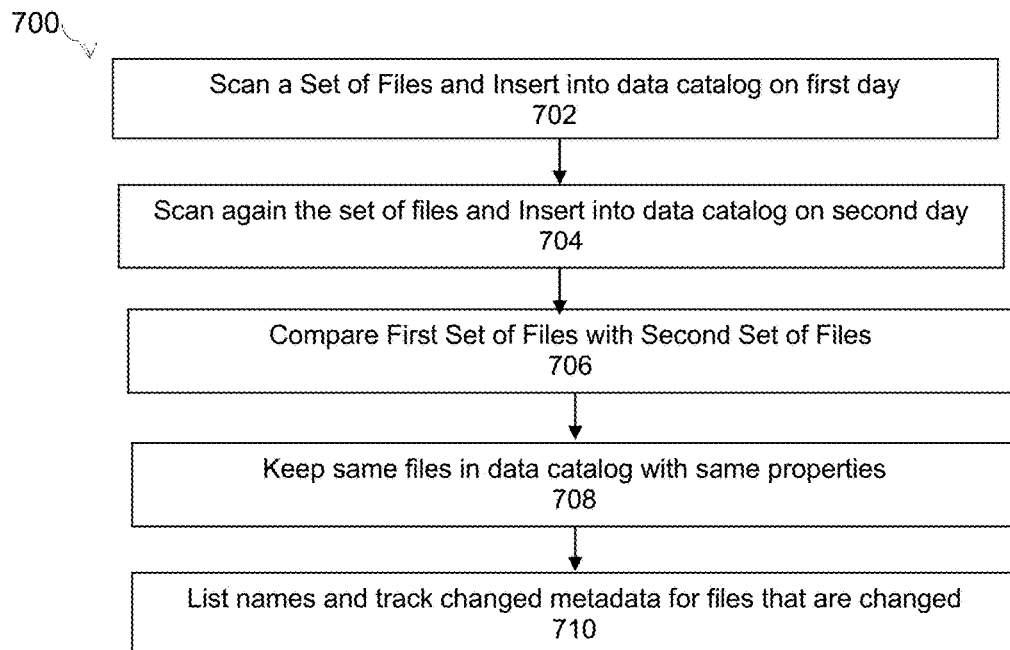
FIG. 7 is a flowchart that illustrates a method of tracking changes in a change file list, under some embodiments.

In an embodiment, a change file list stores names of files that have been changed from one scan period to the next scan period. FIG. 7 is a flowchart that illustrates a method of tracking changes in a change file list, under some embodiments. As shown in FIG. 7, process 700 begins with scanning a set of files on a first day (or other unit of time), 702, and scanning a the set of files again on the second day (or next defined period), 704, and storing metadata for each respect scanned set in a data catalog. For example, on day 0, the system scans 1,000 files and insert them into the data catalog, and on Day 1, it again scans the 1,000 files. In the step 706, the two sets of scans are compared with one another, so that in the example, the system compares the 1,000 files scanned on the day 1 to what was recorded in the data catalog on day 0. Files that remain the same between the two days will appear in the data catalog and have all the same properties on the second day, 708. Files that have been updated or modified will have similar items in the catalog but with a few metadata fields changed (e.g., file size, time stamp, etc.), and these are tracked and the name of the changed files are stored in the change file list. Files that are deleted will be items that existed in day 0 in the catalog, but when scanned for them on day 1 they do not appear on the storage devices (e.g., NAS, object storage, etc.).

In an embodiment, process 115 works on two types of datasets, dynamic and static datasets. Dynamic datasets are datasets where the number of items within a dataset can change at point in time. These are used in process 115 (such as through DataIQ) and are generated upon each query to the data catalog 406. Performing the same query 404 might lead to different results within the dataset. Static datasets comprise a fixed amount of data, i.e., datasets where the number of items, location of the items and lifecycle of the items do not change. The underlying data and its corresponding dataset entries remain intact and cannot be modified once created. The intersection of dynamic and static datasets (common dataset properties) comprises a collection of metadata information of unstructured data.

Figure 8A:
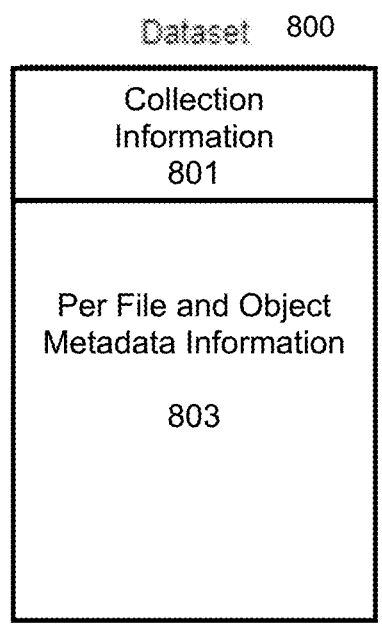
FIG. 8A illustrates the constitution of a dataset, under some embodiments.

Each dataset is collection of metadata information of the files and objects therein. FIG. 8A illustrates the constitution of a dataset, under some embodiments. As shown in FIG. 8A, the dataset 800 comprises metadata information that is broken up to two parts: collection information 801, and per file and object metadata information, 803.

The dataset collection information 801 is metadata information about the dataset as a whole and not information about any individual file or object. The purpose of section is to store items such as: dataset creation time, the query that produced the dataset, Role Based Access Control (RBAC) or Access Control List (ACL) rules on the dataset, and any additional free form metadata that can be added to the dataset. The size and scope of this metadata is generally small in comparison to the per file and object information. The dataset collection information can be considered as the metadata of the metadata.

The per file and object information 803 comprises metadata information on each of the files and objects that make up the dataset. Some examples include: the URI to the location of where the data exists, unstructured metadata information (stat record, ACLs, etc.), and any additional free form metadata information supplied by the system or user.

Figure 8B:
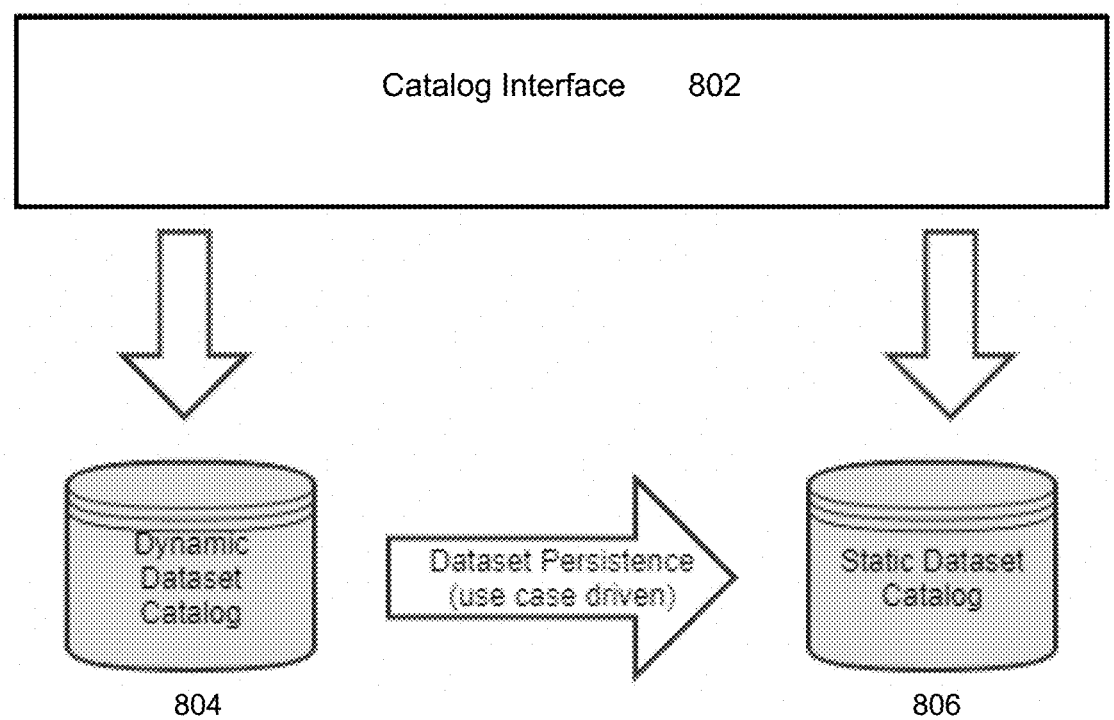
FIG. 8B illustrates a catalog storing information making up a dataset, under some embodiments.

As shown in FIG. 4, in order to be able to create and use datasets, the information that making up a dataset is stored in a catalog 408. FIG. 8B illustrates a catalog storing information making up a dataset, under some embodiments. As shown in FIG. 8B, there are two catalogs under a single catalog interface 802, namely the dynamic dataset catalog 804 and the static dataset catalog 806.

The dynamic dataset catalog 804 is information about the user environments that can help produce the information required to create a dataset. The dynamic dataset catalog is part of a larger system and pipeline within the user environment such as ingesting new data. The dynamic dataset catalog can also sever other use cases for users. It is assumed that the dynamic dataset catalog is latency close to the source of the data. For example, within the same network as a PowerScale or object storage device. There can be multiple instances of the dynamic dataset catalog within a user environment.

The static dataset catalog 806 is where persistent datasets are created and stored. The information in this catalog is the same as the dynamic dataset catalog but designed so that any operation performed on a dataset is done consistently. The static dataset catalog does not necessarily have to be latency close to the data and the size of scope of this will be much different from the dynamic dataset catalog. Static dataset catalogs are use case driven.

Persistent datasets are datasets in which the data within the catalog will not change, that is, update operations are not expected to happen because the data is static, and only READ operations to perform queries are expected. Other operations might include DELETE operations to remove static datasets at some point, or INSERT operations to create new static datasets, but UPDATE operations are much less common. For example, an admin may need to give access to the static dataset to more or less people so they can update the RBAC/ACL permissions on that static dataset.

FIG. 9 is a flowchart illustrating a method of managing datasets lifecycles, under some embodiments. As shown in FIG. 9, process 900 begins with defining a protection policy to protect certain data stored in different storage devices and/or network environments, 902. For example, a protection policy could be defined to backup all X-ray data from a clinic regardless of where and how it is stored, or to archive all NAS data to the cloud, and so on. The process gathers all of the metadata of data objects to be protected, such as using DataIQ or similar process, 904. The gathered metadata is stored in a catalog, 906. A user entered query is then run against the catalog to generate a dataset, 908. The query comprises metadata selectors as tags for matching against the cataloged metadata. The response to the query comprises the dataset, and the defined protection policy (from 902) is then applied to the dataset to protect or otherwise operate on the corresponding content data, 910.

In an embodiment, the dataset management process implements a semi file structure aware mechanism. Large systems may have user content placed in non-native formats for files, objects, data elements, and so on. For example, data content of a certain type (e.g., .xls spreadsheet data) may be placed in tar, zip or other archive file formats. As a result, this content is hidden from plain view and may be mismanaged.

Figure 10:
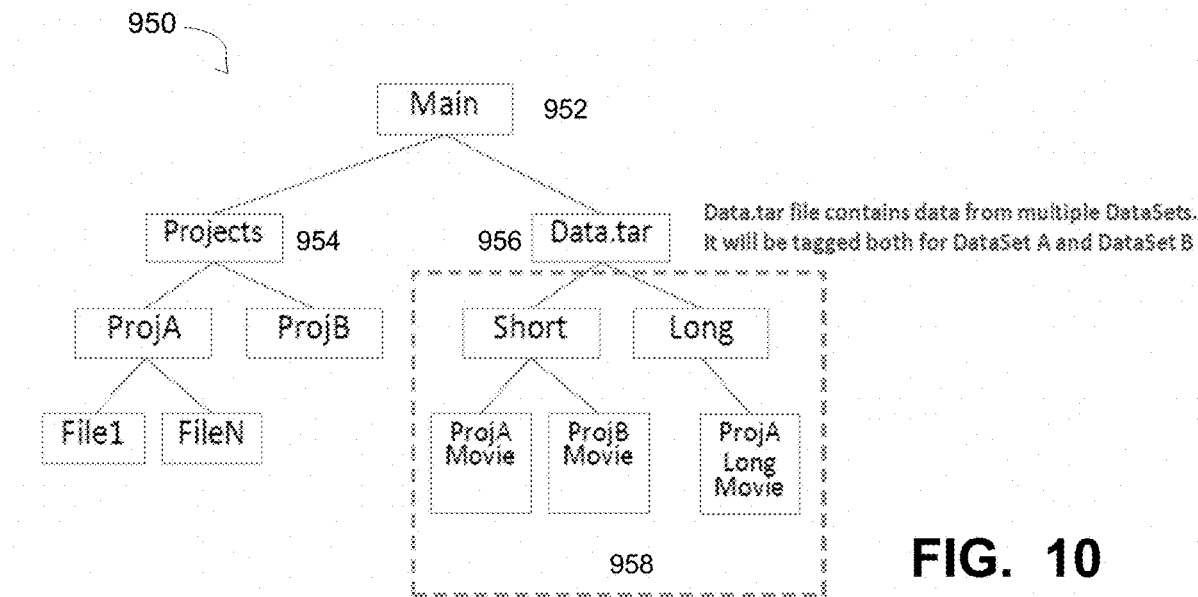
FIG. 10 illustrates an example of semi structure-aware datasets, under some embodiments.

FIG. 10 illustrates an example of semi structure aware datasets, under some embodiments. As shown in FIG. 10, an overall filesystem 950 may include a main directory 952, which in turn holds directories for projects and archived data (.tar files). The projects directory 954 contains two directories 'ProjA' and ProjB'. The ProjA data will form dataset A and the ProjB data will form dataset B. The Data.tar directory 956 contains both ProjA and ProjB movie data 958, and therefore contains data from multiple datasets. Accordingly, it will be tagged with metadata for both dataset A and dataset B. Thus, these datasets have metadata that references both regular content data (under 'Projects') and archived data (under 'Data.tar').

Figure 11:
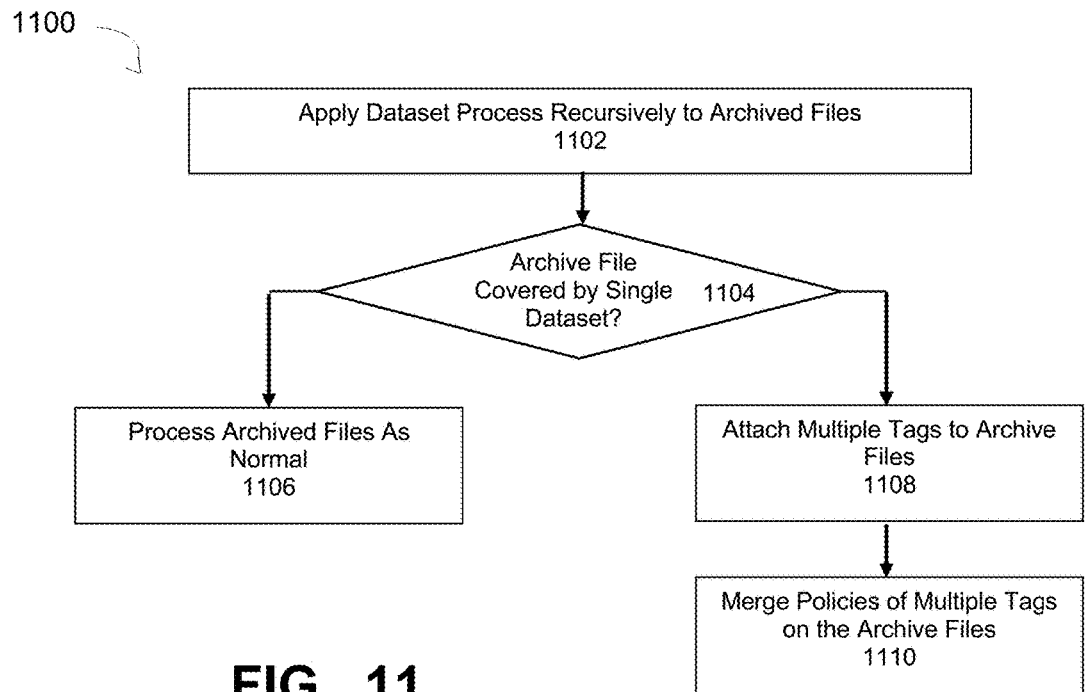
FIG. 11 is a flowchart illustrating a method of applying dataset processing to disparate file format datasets, under some embodiments.

FIG. 11 is a flowchart illustrating a method of applying dataset processing to disparate file format datasets, under some embodiments. This process 1100 applies the dataset process 115 recursively to contents of archive or similar files, 1102. If all of the contents in an archive file is consistent with a single dataset classification, as determined in step 1104, then the process treats the archived files as simply another type of storage, and the metadata tagging and dataset generation proceeds as shown in FIG. 9, step 1106.

However, if the contents of the archive classifies into multiple datasets, the process tracks and tags the contents of the archive as if they were stored in native format. Multiple tags are attached to the archive files, 1108. The multiple tags reflect the fact that data that is archived usually comprises files of different types. For example, data stored in a compressed/archived format (e.g., tar, zip, rar, etc.) can have files in the archive tagged as 'office documents' from applications such as MS-Word, Excel, PowerPoint, etc., while other may be audio visual image files (e.g., jpg, png, bmp, etc.) and be tagged as 'images.'

The process then merges the policies of all the tags on the archive file, 1110. This can be done according to the most restrictive policy. However, other options are also possible. For example, if dataset A has a data protection policy that requires daily backups and dataset B requires hourly backups, the process does hourly backups on the archive file. This evaluation can be made for every parameter separately. Process 1100 thus applies policies and other management operations even on archive files based on the archive content.

As shown in FIG. 8B, datasets can be characterized as dynamic datasets or static datasets. Static datasets are datasets that are fixed in size and cannot be modified. Such datasets are useful for data that is to be retained according to strict retention rules, such as documents placed in legal hold discovery, certain medical or sensitive business data, top secret information, and so on.

Figure 12:
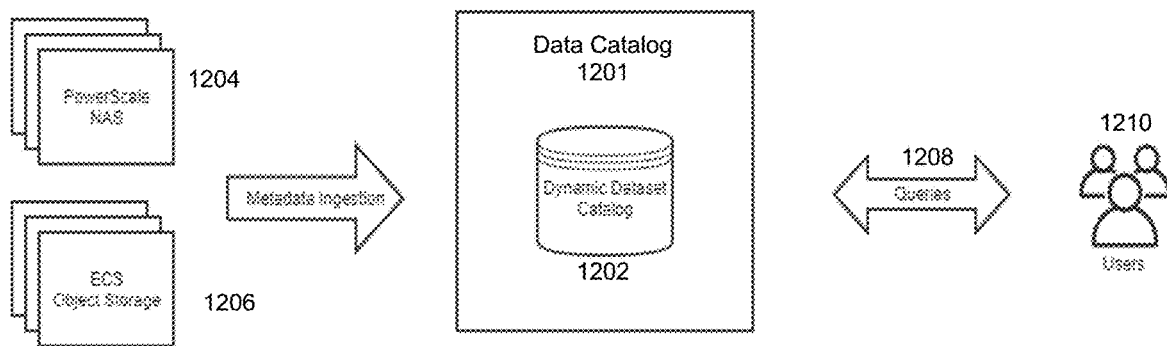
FIG. 12 illustrates a dynamic dataset processing user queries, under some embodiments.

Dynamic datasets are datasets wherein the items and/or characteristics of these items can change over time, and a dynamic dataset catalog is often used when a user environment is ingesting new data. For example, dynamic datasets can be used by an IT organization to implement charge/show back processes to handle capacity and perform resource planning. FIG. 12 illustrates a dynamic dataset processing user queries, under some embodiments. As shown in FIG. 12, a dynamic dataset catalog 1202 ingest metadata from different data stores, such as NAS 1204 and ECS 1206.

For this embodiment, a data mover process 1201 is setup to crawl and index multiple sources such as NAS and ECS, and the users 1210 of the system are then able to find all data related to a particular project, department, cost center, etc. through queries 1208, and then implement their own application models.

In the case of an IT chargeback/showback application, the dynamic datasets 1202 which are stored within data catalog 1201 will be able to help the user answer questions, such as: How much data project X using? Does their data usage match to the expected service? Are they using more or less data then anticipated? Projecting their rate of growth, can demand be met? What storage mediums are being used for project X? Is this the most cost effective medium? How active or cold is their data?, and so on.

An IT chargeback and IT showback are generally known as two policies used by information technology (IT) departments to allocate or bill the costs associated with each department's usage, so that appropriate money can be transferred from one group to another.

In this scenario, dynamic datasets are unaware of the type of questions/queries that users are asking of it, and this provides the ability for users to ask generic questions, and have user decisions based on the data that is produced by dynamic datasets, and provides flexibility to be integrated into new or existing workflows.

In an embodiment, a static dataset can be created from one or more dynamic datasets in response to queries input by a user to find the data they are looking for. For example, "find all files related to project X across my environment." These files can span multiple sources like NAS and object storage. The queries will produce a set of results that are dynamic datasets, and the user can then convert those dynamic dataset(s) into a static dataset.

Figure 13:
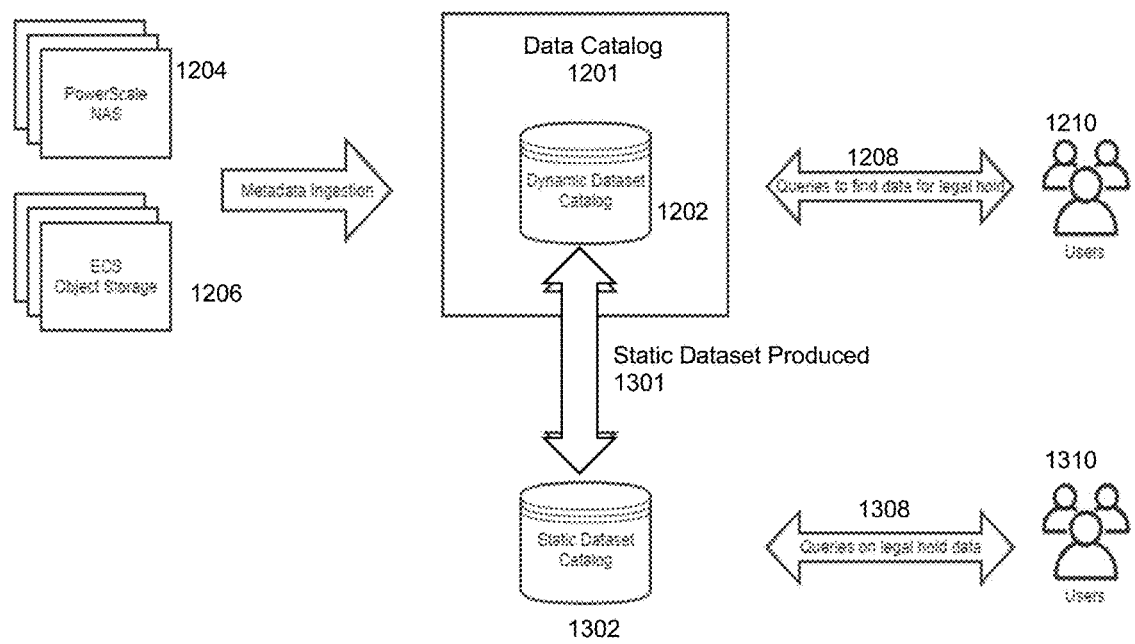
FIG. 13 illustrates the conversion of dynamic datasets into a static dataset, under some embodiments.

FIG. 13 illustrates the conversion of dynamic datasets into a static dataset, under some embodiments. As shown in FIG. 13, the dynamic dataset catalog 1202 in data catalog 1201 is queried by users 1210 to find data for all data stored in NAS 1204 and ECS 1206 for legal hold. Such data may be data tagged with the string "legal hold" or containing some other metadata indicating its status as a file to be retained under legal hold rules. The query 1208 in this example case is simply something like "find all data subject to legal hold." This query will then produce a dataset 1301, which is essentially static as of the moment it is generated by query 1208. This static dataset is then stored in static dataset catalog 1302. Being restricted and subject to strict non-modification rules, this data cannot be modified, deleted, added to, or any other such operation, and users 1310 can then make queries 1308 on the legal hold data, that does not impact the static nature of the dataset. 1301.

With respect to specific applications, a legal hold is a process that an organization uses to preserver potentially relevant information when litigation is pending or anticipated. Such a hold may be mandated by certain court rules (e.g., Federal Rules of Civil Procedure), and may be initiated by a notice from legal counsel to an organization that suspends the normal disposition or processing of records, such as backup tape recycling, archived media and other storage and management of documents and information. Legal holds may be issued as a result of litigation, audits, government investigations or other such matters to avoid spoliation of evidence, and can encompass business procedures affecting active data, including backup tape recycling.

Figure 14:
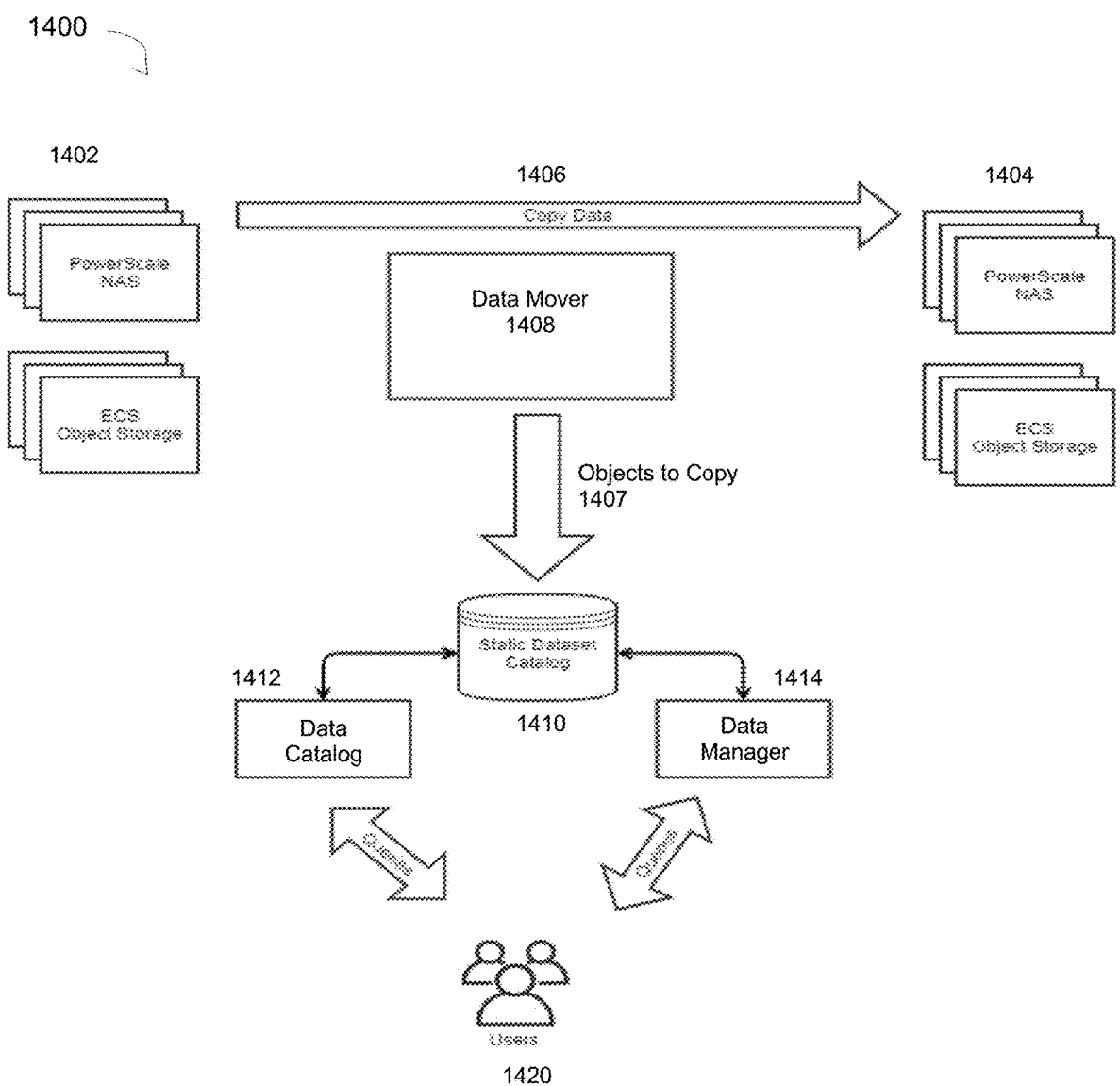
FIG. 14 illustrates a process of converting a dynamic dataset into a static dataset, under some embodiments.

FIG. 14 illustrates a process diagram for converting a dynamic dataset into a static dataset, under some embodiments. As shown in FIG. 14, the conversion process 1400 for converting to a static dataset includes copying 1406 the results of the dynamic dataset into the static dataset catalog 1410. The data is copied from a first storage system 1402 to another storage system 1404. The process adds an entry to the static dataset catalog 1410 to record the URI of the copied data 1407. A data mover 1408 could integrate with the static dataset and move the data as part of a workflow that is exposed in data catalog 1412 or data manager 1414. Users 1420 can then query the static dataset catalog 1410 through these interfaces. The data mover 1408 may comprise any process or component that effects movement of a data element, such as a copy command, sync command, backup agent, and the like.

Large-scale data networks pose issues with respect to efficiently controlling access to data placed in multiple locations and used by large numbers of people and teams. Hierarchical control systems used in present methods only consider the location of the data and the roles and groupings of people within an organizational chart to define and enforce access rules. In an embodiment, the dataset management process 115 extends the dataset concept to content-driven access security as opposed to location-based access security. In this case, access rules are devised and applied according to what the restricted or protected data element is and not where it resides. The process 115 applies RBAC and ACL rules to the content data using datasets, to thus provide content-based access security based on users, roles, and access to data assets in an organization.

An Access Control List (ACL) is a list of permissions associated with data objects that specifies which users or system processes are allowed on given objects. It is usually embodied as a table specifying a subject and an operation, such as (Jane: read,write; John: read). Role-Based Access Control (RBAC) rules allow or deny access on the basis of role-permissions or user-role and role-role relationships, as opposed to strict user identities. Within an organization, roles are created for various job functions (e.g., Engineering, Sales, IT, etc.), and RBAC permissions assign certain operations or access permissions to specific roles. People can automatically acquire or lose permissions by taking on or losing different roles.

It should be noted that other permissions or access policies and rules may also be defined and used besides or in addition to ACL and RBAC, such as custom permissions. For the purposes of description, rules and policies that affect user access to data elements (files, directories, filesystems, etc.) are referred to as 'access rules' or 'access security rules' to distinguish from the 'security rules' described above that dictate how data is protected by backup/restore/move/clone/tier operations, and so on.

Figure 15:
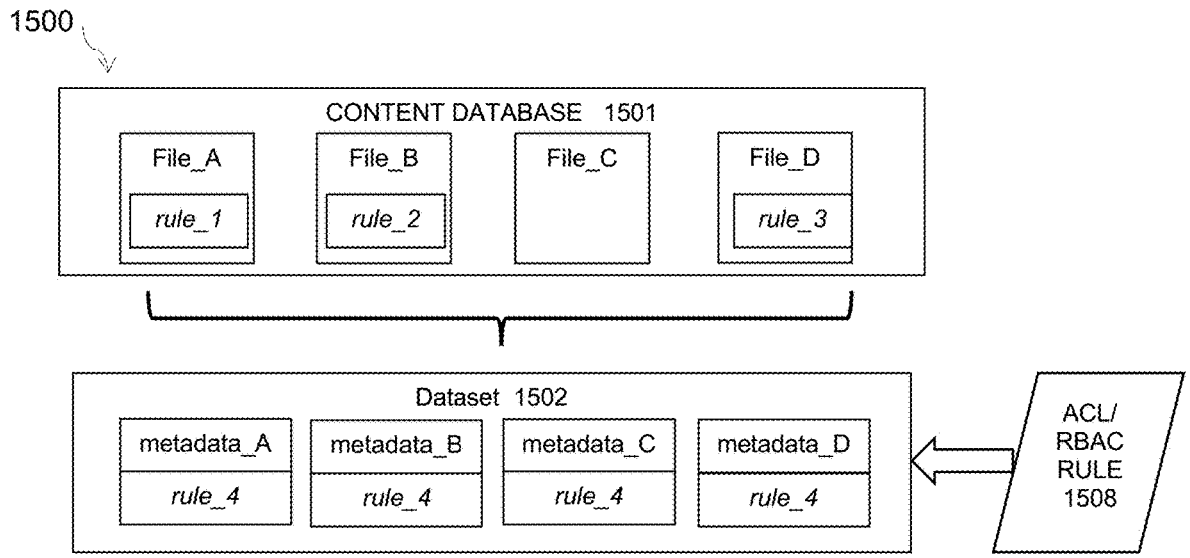
FIG. 15 illustrates application of RBAC and ACL access rules to content data through datasets, under some embodiments.

FIG. 15 illustrates application of RBAC and ACL access rules to content data through datasets, under some embodiments. As shown in FIG. 15, system 1500 comprises a database 1501 storing content data in the form of a number of files (such as denoted Files A through D). Some of the data elements may have access rules applied to them, such as Files A, B and D having rules 1, 2, and 3, respectively, with no rule assigned to File C.

As described above, a data catalog process scans the database to find appropriate metadata (such as denoted metadata A through D) to gather and store in a dataset 1502. A security or access rule, in the form ACL or RBAC rules 1508 is defined for and applied to the dataset 1502 as a whole, such as rule 4, as shown. The dataset provides the base security settings for each of the metadata elements in the dataset, and therefore, the corresponding content data in the database.

In an embodiment, the access rule 1508 may be written specifically for a dataset by a user or system administrator. Alternatively, it may be generated and applied by an automated process, such as for pre-defined or specially tagged datasets, such as based content (e.g., top secret, legal hold, medical, etc.).

Access rules like Access Control Lists (ACL) Roll Based Access Control (RBAC) all follow an inheritance model, so that each dataset element can still have traditional (i.e., hierarchical) access rules applied thereto, and have elements in the dataset inherit from that rule. When an element (metadata) is tagged as belonging to a dataset, it is automatically associated with the dataset access rules and posture for that dataset. For the example of FIG. 15, the ACL/RBAC access rule 1508 may be denoted 'rule_4' and this rule is then associated with each of the metadata elements in dataset 1502. In general, the dataset assigned rule 1508 supersedes any individually assigned data element rule, so that rule_4 will supersede any of the rules 1, 2, 3 if those data elements are assigned to dataset 1502.

Certain priority polices are used to resolve conflicts among different rules or between inherited and assigned rules. For example, rules that deny or block access are given priority over rules that allow access, so as to maintain as tight a security as possible. Such conflict rules can be defined based on system constraints and requirements, and other or different conflict rules can also be used. Any applied rule can usually be reviewed and revised by system admin as needed, such as temporarily grant access that has been blocked by a rule, or vice-versa.

To exemplify the application of access rules, consider two users "John" and "Jane" who are both part of the group called "Users" that can access the directory "/data/adam." Because of hierarchy, everything under /data/adam/folder1/;/data/adam/folder2/; etc. will also be granted to the group called users, or these users would be blocked if the system applied a 'deny' policy to the group called "Users." Likewise, if there is a group called "Engineers" that John but not Jane is a part of, and a rule denies access by Engineers, Jane would have access but not John, since the deny rule always takes high priority over grant/allow.

As shown in FIG. 15, the same rule is applied to all data elements referenced within a dataset 1502. The entire dataset thus has a rule or rules applied to it that get applied to each member of that dataset. If a single member or subset of members requires a different rule, this dataset would be divided into different datasets for the purpose of content-based access rule applications. This different dataset would be created so that it has just that one member (or member subset) and the rule then applied to that subset. For example, in FIG. 15, if File_B needed a different access rule than rule 4, it would be removed from dataset 1502, and put into a different dataset.

It should be noted that datasets may cross filesystems, deployment and even technology boundaries (e.g., files and object stores), so that security is applied in one way across possibly multiple technology stacks. This mechanism provides security by content, where the access rules will be applied automatically to new elements introduced as they are automatically classified into a dataset. Security settings will move with the data when it changes location. A similar security mechanism can be applied across directories, filesystems and even between filesystems and object storage.

Figure 16:
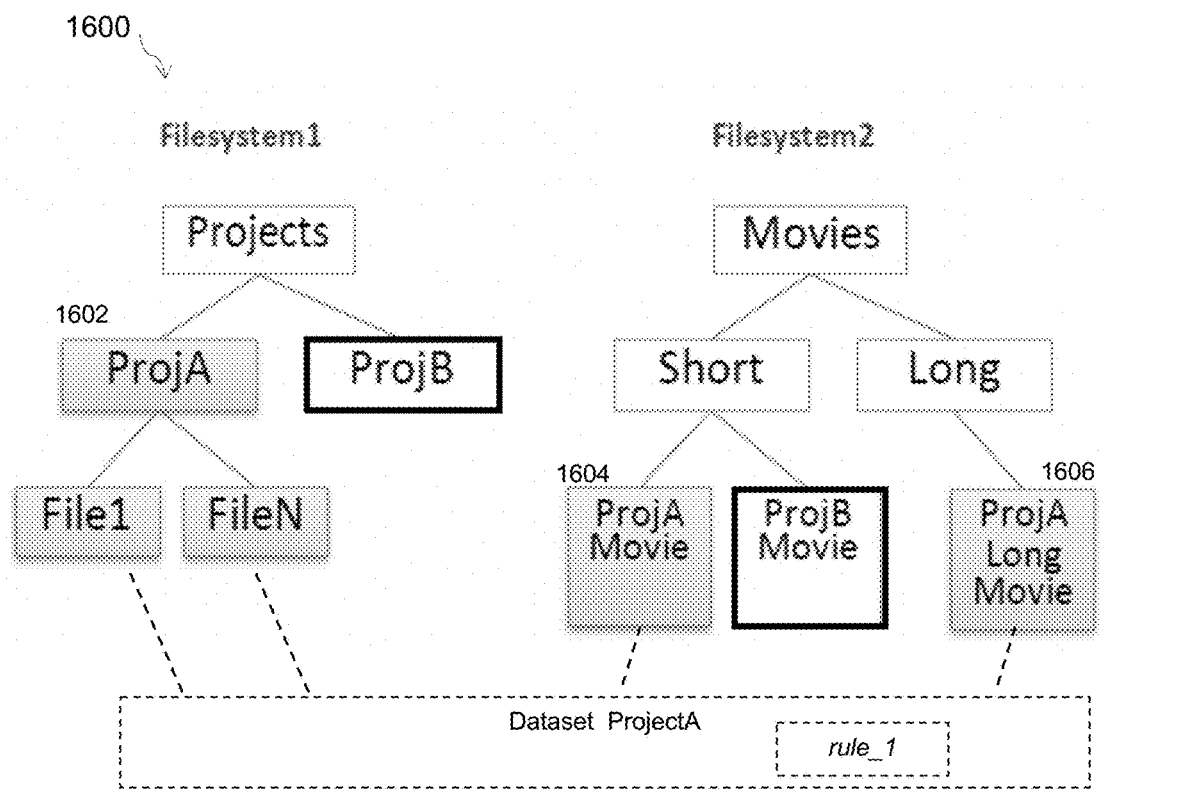
FIG. 16 illustrates an example of access rules applied to content data defined by datasets, under some embodiments.

FIG. 16 illustrates an example of access rules applied to content data defined by datasets, under some embodiments. FIG. 16 illustrates the content data directory structure used to define a semi structure-aware dataset, as illustrated in FIG. 10. For this embodiment, the content data for 'ProjA' are to be grouped into one dataset, regardless of the filesystem or storage location where it resides. Thus metadata for the ProjA file 1602 in Filesystem1 comprises File1 and FileN are combined with the metadata for the ProjA Movie 1604 and the ProjA Long Movie 1606 in Filesystem2 to form a single dataset 'DataSet ProjectA.' A single access rule can be applied to this dataset to limit access to these files and content data to 'ProjectA' people based on a single rule applied to the dataset itself. This greatly improves upon traditional hierarchical rule application, which requires the directory and its descendants in each filesystem to be associated with the rule, and each data element (e.g., movie) file to be found and associated with the rule. For this simple example, this old procedure requires going into two different filesystems and down certain hierarchical directory trees. It can be seen that more realistic and complex databases would pose challenges in efficiently associating appropriate access rules to content data, in contrast to the dataset embodiment illustrated in FIG. 16, which can automatically apply a particular rule "rule_1" to all of the data referenced by the metadata in the dataset. In the figure, the different data objects for the separate datasets are distinguished by the heavy borders around the ProjB data, and belonging to Dataset B.

Monitoring of Data for Reports

As stated in the Background ever increasing volumes of data lead to complex data asset monitoring and easily accessing data placed in multiple locations and used by many different people and teams can be difficult. The preferred practice of putting frequently or most-recently used data for projects (with high rate of read/write access) on faster storage, while relegating older (and read-only) to slower storage and monitoring them only for unexpected writes, is not particularly easy in present systems.

Embodiments of process 115 provide a data management system that monitors data ownership and use throughout an entire organization to efficiently place data assets in appropriate storage locations and/or assign appropriate attributes to the data for efficient use. This process provides content-based monitoring, as opposed to location-based monitoring.

Figures 17, 18:
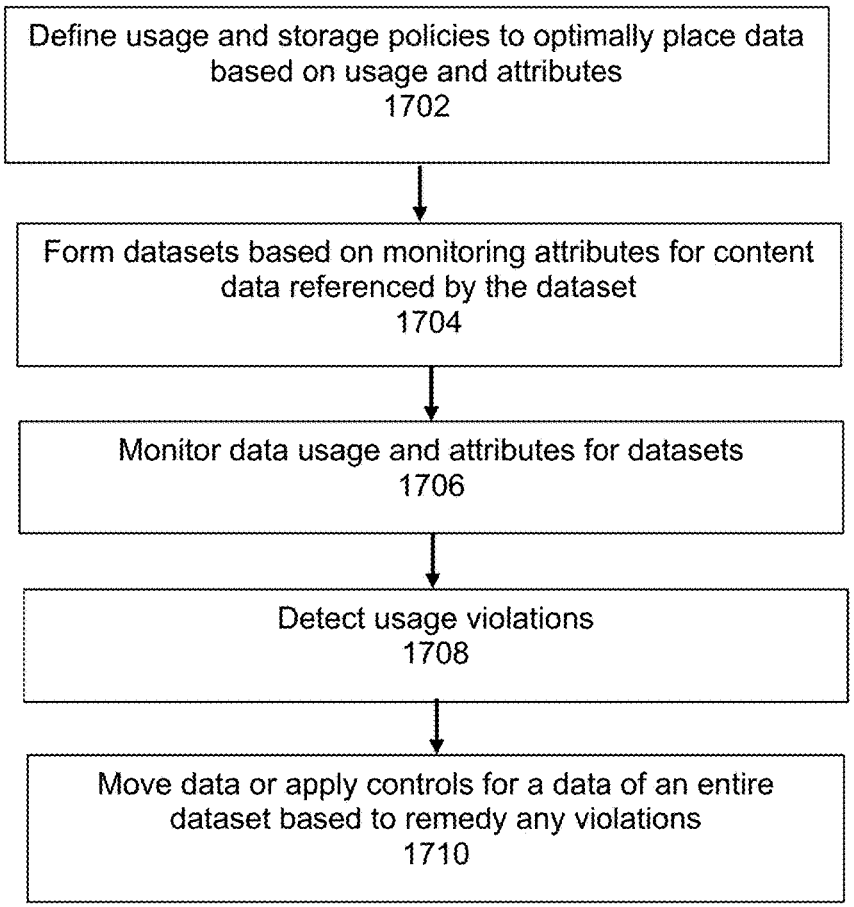
FIG. 17 is a flowchart illustrating a method of providing content-based data asset monitoring, under some embodiments.
FIG. 18 is a table that lists some parameters comprising usage and storage policies, under some embodiments.

FIG. 17 is a flowchart illustrating a method of providing content-based data asset monitoring, under some embodiments. The process 1700 generally applies monitoring attributes using datasets to reveal optimal data placement and processing based on project rather than filesystem level analysis. In this way, system administrators can easily spot situations, such as a project that was supposed to be read-only was changed, or a "hot" project (with high rate of read/write throughput) was mistakenly placed on a slow storage device. Such a process can also be used to automatically recognize that certain files of a dataset were placed on a filesystem that does not support protection or encryption, while the dataset has "protection" or "encryption" tag.

As shown in FIG. 17, process 1700 begins by defining usage and storage policies for selected sets of data assets, 1702. FIG. 18 is a table that lists some parameters comprising usage and storage attributes used to formulate data movement and access policies, under some embodiments. As shown in FIG. 18, table 1800 lists some usage patterns and attributes 1802 against data location and control assignments 1804 to define policy rules 1806 that can be applied to data having common activity and attributes. For example, data activity could comprise amount of read/write accesses within a certain period of time, and the like; data restrictions could comprise data confidentiality, sensitivity, storage requirements, and the like; and project priority can include scaled or subjective characterizations of the importance, priority, or recency (e.g., "hot/warm/cold") of a current project, and the like.

The control assignments 1804 can include storage location to dictate where certain data should be stored based on activities, restrictions, priority, etc., such as fast local storage (expensive), fast remote storage, remote slow storage (cheaper), archive storage sites, and so on. They can also include access control rules (e.g., ACL/RBAC) to limit access to data based on the activity, restrictions, priority, etc., or movement control to limit or require movement or tiering of data based on activity, restrictions, priority, etc. A set of policy rules 1806 can be formulated that dictates storage location, and access/movement controls on the data based on the activity/restriction/priority characteristics 1802. For example, such policies may include rules data activity versus storage location, such as: frequently/recently used data is to be stored in fast (e.g., local HDD, SSD, cache memory, etc.) storage sites closest to the user (physically/geographically), while stale data is to be stored in archive (slow HDD, tape, cloud, etc.) storage sites remotely located from the user, and so on.

The various elements of table 1800 comprise attributes that are monitored and tracked to form so-called 'monitoring attributes.' The table of FIG. 18 is provided for purposes of illustration only, and any other set of usage patterns and attributes 1802 and/or location and control assignments 1804 forming the monitoring attributes may be used.

With reference back to process 1700, the selected data assets are then organized into appropriate datasets based on the monitoring attributes, 1704, in the same manner described above using defined filters, tags, and so on.

The system then monitors the data usage and accesses for the data objects referenced by the dataset using the monitoring attributes, 1706. Certain usage, storage, or access violations may occur during the course of normal and irregular or even malicious activities, which would be detected by the monitoring component, step 1708. The detection step is basically performed by applying the policy rules 1806 to the monitored activity to see if any rule or rules are violated by undesirable data movement, storage, accesses, or other activities. If any violations are detected, an administrator or automated process can then be alerted and notified to take remedial action. Such remedial action can include moving the data to a more appropriate location, blocking access to the data, and so on.

In an embodiment, certain operating ranges and min/max threshold values are defined to determine whether or not any rules have been violated or whether the system is operating sub-optimally with respect to the monitoring attributes. For example, a certain activity in terms of minimum number of read/write requests within a defined amount of time may be considered 'active' or sufficiently active versus 'inactive' for purposes of moving data to faster memory. Likewise, certain memory devices may be characterized as 'fast' or 'slow' based on defining performance parameters in relation to device characteristics and capabilities. Other monitoring attributes may be measured and deemed violated based on objectively clear parameters, such as access by unauthorized users, access at improper times, and so on.

By this process and system, monitoring attributes will be applied automatically to new data elements introduced into the system as they are automatically classified into a dataset. The monitoring attributes will also move with the data when it changes location.

Any violations of the rules for monitoring attributes can be detected across all data objects referenced by the dataset contents (metadata) no matter where or in which storage site the data is stored. This is facilitated by the formulation and composition of the datasets that encompass the content data in the system.

Figure 19:
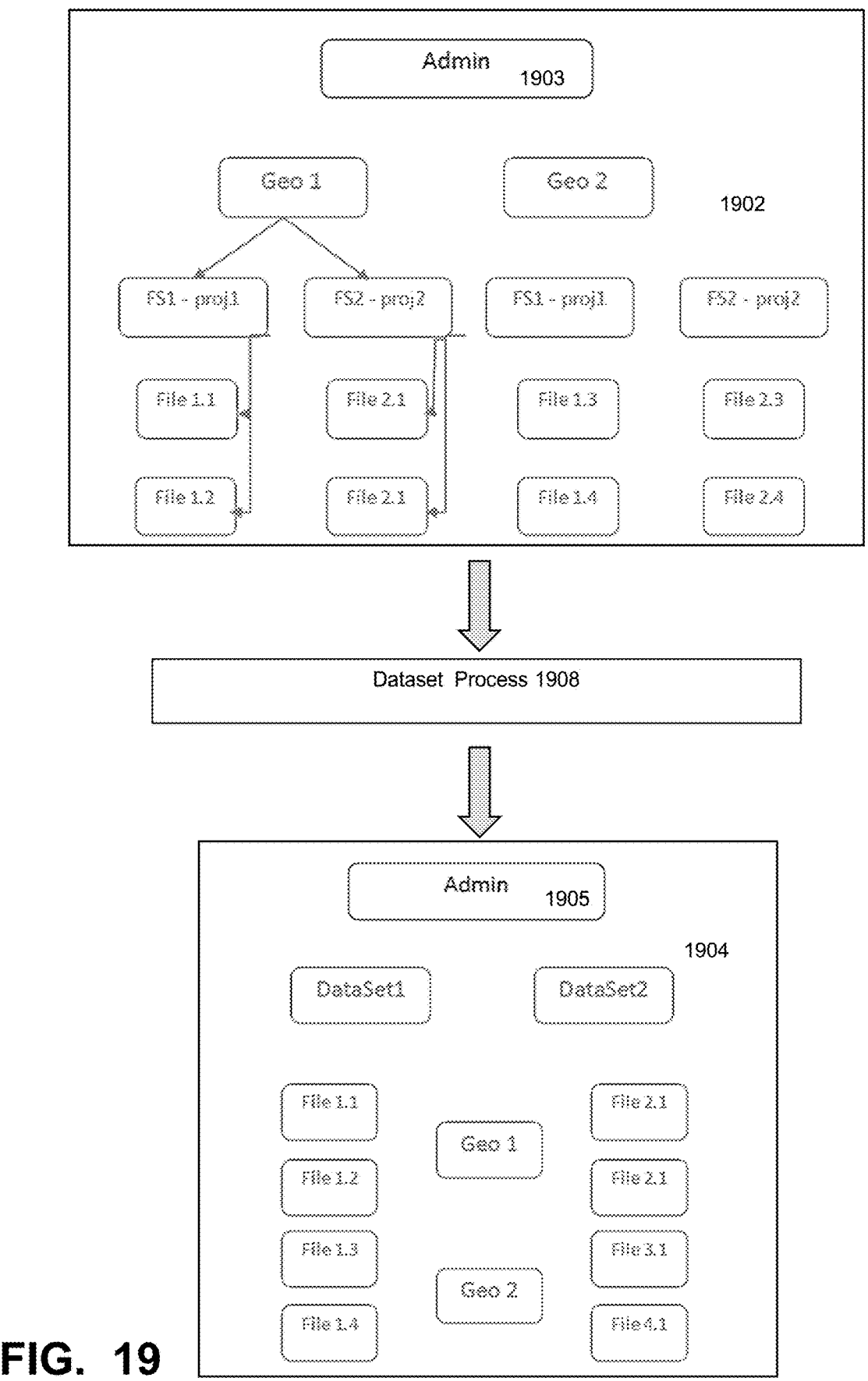
FIG. 19 illustrates an example case of applying datasets to enforcing monitored attribute rules, under some embodiments.
Figure 20:
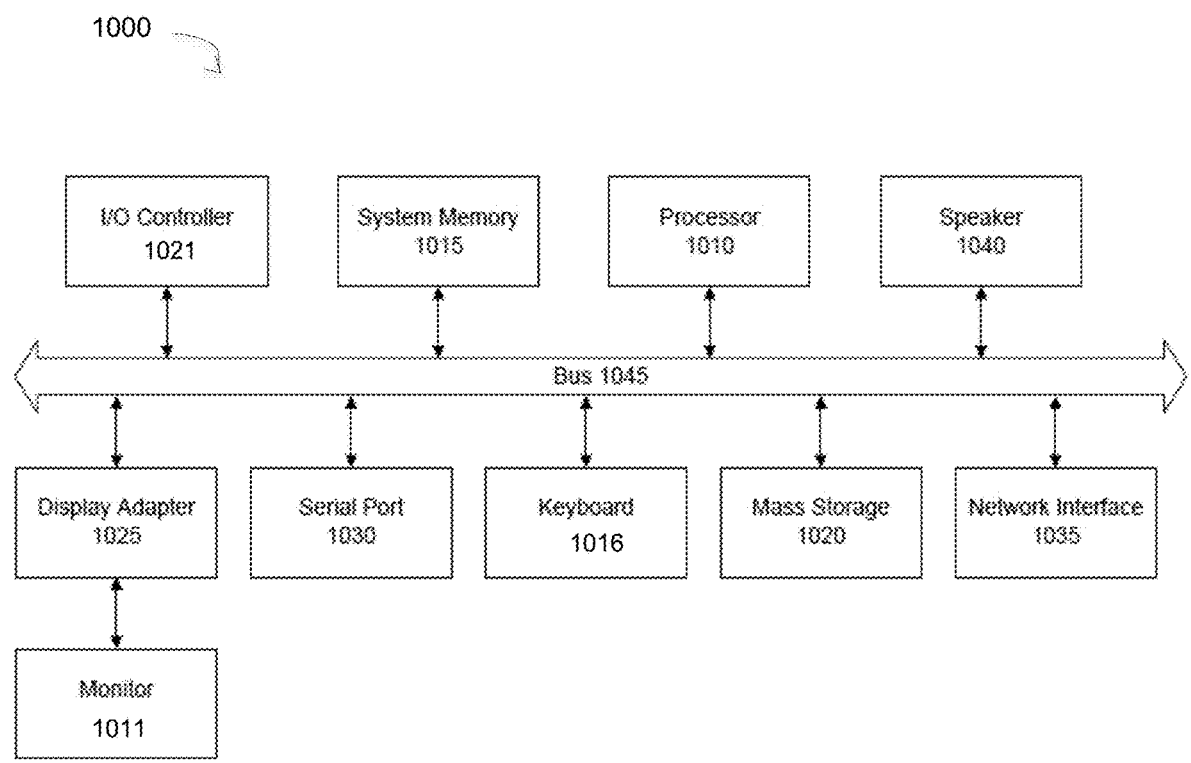
FIG. 20 is a block diagram of a computer system used to execute one or more software components of a system for content-based dataset management, under some embodiments.

FIG. 19 illustrates an example case of applying datasets to enforcing monitored attribute rules, under some embodiments. As shown in the diagram of FIG. 19, a traditional hierarchical directory 1902 of files by geographic location (Geo1, Geo2) and filesets (FS1, FS2), organizes files in a top down manner, where files are identified and located relative to their filesystem affiliation, which is then geographically specified. In this type of system, the administrator 1903 needs to monitor each geographic location separately, and must combine monitoring outcomes from different geographical locations for the same project to make sure that not usage or access rules have been violated.

In an embodiment, the dataset process 1908 forms a dataset for the filesystem data using the monitoring attributes defined by a user or the system. This produces a file structure 1904 in which the data is organized by dataset (e.g., DataSet1, DataSet2) as opposed to geographical location. Because of the grouping of data with common usage and access monitoring attributes, violations can be more easily detected and remedied. For file structure 1904, the administrator 1905 only monitors the datasets regardless of the location where the referenced data is located. Any violations to the usage and access policy rules 1806 are seen on the dataset level. The administrator 1905 can then check which file or files are affected, and then act upon the violations. This can include moving the files, restricting access to the files, and so on.

As described above, in an embodiment, system 100 include certain processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

FIG. 17 is a block diagram of a computer system used to execute one or more software components of a system for content-based dataset management, under some embodiments. The computer system 1000 includes a monitor 1011, keyboard 1016, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 4 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of optimizing storage placement and access to content data in a data processing system using content-based datasets, comprising:

executing a processor-based search engine to scan content data stored in a database to identify metadata associated with data elements to be monitored on the basis of monitoring attributes including usage and access patterns;

gathering the identified metadata for storage in a data catalog;

executing, by the search engine, a user entered query against the metadata in the data catalog to automatically generate a dataset comprising metadata selectors as tags for matching the identified metadata;

defining rules based on the monitoring attributes, wherein a rule dictates a storage location of data or access permissions to the data by one or more persons or groups in the system and a subjectively scaled characterization of the data as important in a current project by the one or more persons;

applying a protection policy to the dataset to protect the content data, wherein the dataset spans multiple storage devices of different storage types, and wherein the dataset defines a single data access unit for the referenced data elements from the database, and further wherein the monitoring attributes are applied to the referenced data elements as a single unit based on data content rather than data location, and yet further wherein the content data comprises archive data classified into multiple datasets, each having different protection policies;
recursively processing the archive data to attach corresponding tags to each dataset;
merging policies of the corresponding tags based on a most restrictive policy of the different protection policies for the archive data to define the protection policy; and
executing a processor-based backup process using the protection policy to store the archive data in storage media.

2. The method of claim 1 wherein the monitoring attributes comprise at least one of: data activity including an amount of read/write accesses within a certain period of time, data restrictions including status as confidential or sensitive data, and storage requirements.

3. The method of claim 2 wherein the defined rules apply the monitoring attributes to data placement and control options comprising at least one of: a storage location of the data, access control to the data, and control of data movement.

4. The method of claim 3 wherein an optimum storage location is selected based on at least one of: speed of memory access, network latency, and location proximity to the user.

5. The method of claim 4 wherein the rule dictates that data of an activity level above a defined threshold is stored in fast storage devices or memory proximate the user.

6. The method of claim 3 wherein the access permissions are derived from one of a defined access control list (ACL) or role-based access control (RBAC) process.

7. The method of claim 1 further comprising detecting a violation of the rules in order to apply remedial action to content data affected by the violations, and applying the remedial action prior to the step of executing the backup process.

8. The method of claim 1 wherein the monitoring attributes are applied automatically to new data elements introduced into the system automatically as they are classified into a dataset, and wherein the monitoring attributes move with corresponding data elements as they change storage location in the system.

9. The method of claim 8 wherein the multiple storage devices comprise network attached storage (NAS), object storage, local storage, or cloud networks, and wherein the dataset automatically tracks data added, removed or relocated to a body of data associated with the defined monitoring attributes.

10. The method of claim 9 wherein the multiple storage devices further comprise data storage deployed in different network environments including core networks, edge networks, and cloud networks.

11. The method of claim 1 wherein the metadata selectors comprise alphanumeric strings applied to respective data objects based on user-defined rules, and define at least one of a file type, name, location, creation time, or characteristic.

12. A computer-implemented method of monitoring data assets in a system to optimize storage and access of the data assets searchable by a processor-based search engine, comprising:

identifying archive data for storage in a network having different storage types and classified into multiple datasets, each having different protection policies;
creating a dataset by grouping metadata for data objects that are grouped together by one or more filters, wherein the dataset spans multiple storage devices of the different storage types, and wherein the dataset defines a single usage and access policy for the data objects, and wherein the dataset comprises metadata selectors as tags for matching the metadata;
executing the search engine to initiate a query that generates the dataset through application of the filters; and
monitoring the usage and access policy as the data objects are processed in the system through monitoring attributes defining rules dictating a storage location of data or access permissions to the data by one or more persons or groups in the system and a subjectively scaled characterization of the data as important in a current project by the one or more persons;
applying a protection policy to the dataset to protect the content data, wherein the monitoring attributes are applied to the referenced data elements as a single unit based on data content rather than data location;
recursively processing the archive data to attach corresponding tags to each dataset;
merging policies of the corresponding tags based on a most restrictive policy of the different protection policies for the archive data to define the protection policy; and
executing a processor-based backup process using the protection policy to store the archive data in storage media.

13. The method of claim 12 further comprising:
storing the dataset in a scanning data catalog, the scanning data catalog comprising the grouped metadata for the data objects; and
generating the dataset by running the query on the scanning data catalog, wherein the query comprises the metadata selectors applied to the scanning data catalog.

14. The method of claim 13 wherein the monitoring attributes comprise at least one of: data activity including an amount of read/write accesses within a certain period of time, data restrictions including status as confidential or sensitive data, and storage requirements.

15. The method of claim 14 wherein storage and access policy comprises rules that apply the monitoring attributes to data placement and control options comprising at least one of: a storage location of the data, access control to the data, and control of data movement, and wherein an optimum storage location is selected based on at least one of: speed of memory access, network latency, and location proximity to the user.

16. The method of claim 15 wherein the at least one rule of the rules dictates that data of an activity level above a defined threshold is stored in fast storage devices or memory proximate the user, and wherein the access permissions are derived from one of a defined access control list (ACL) or role-based access control (RBAC) process.

* * * * *